United States Patent
Watanuki et al.

(10) Patent No.: US 6,428,385 B1
(45) Date of Patent: Aug. 6, 2002

(54) GRINDING MACHINE FOR GRINDING BAR MEMBER FOR MAGNETIC HEAD AND METHOD OF GRINDING THE SAME

(75) Inventors: Motoichi Watanuki; Naohisa Matsushita, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 39 days.

(21) Appl. No.: 09/638,430

(22) Filed: Aug. 14, 2000

(30) Foreign Application Priority Data

Nov. 5, 1999 (JP) .......................................... 11-315674

(51) Int. Cl.$^7$ .......................... B24B 49/00; B24B 51/00
(52) U.S. Cl. .................................. 451/5; 451/8; 451/11
(58) Field of Search .............................. 451/8, 10, 11, 451/5, 24, 57, 278, 279, 387, 389, 405

(56) References Cited

U.S. PATENT DOCUMENTS 5,117,589 A * 6/1992 Bischoff et al. ............ 451/405
5,899,793 A * 5/1999 Yanagida et al. .............. 451/8
6,050,878 A * 4/2000 Kanzo et al. .................. 451/5
6,074,283 A * 6/2000 Maeda et al. ................. 451/53
6,196,897 B1 * 3/2001 Suto et al. ..................... 451/8

FOREIGN PATENT DOCUMENTS

JP          7-60637          3/1995

* cited by examiner

Primary Examiner—M. Rachuba
(74) Attorney, Agent, or Firm—Greer, Burns & Crain, Ltd.

(57) ABSTRACT

The grinding machine and the method of grinding are capable of grinding a bar member for a magnetic head with higher grinding accuracy. In the grinding machine, a holding frame holds a bar member and heads a first face of the bar member, which is to be ground, downward. A grinding plate grinds the first face of the bar member. An actuator presses a second face of the bar member held by the holding frame so as to press the first face onto the grinding plate. A resistance monitor monitors a resistance value of a sensing part of an ELG element section of the bar member so as to adjust a strip height of a magnetic head section of the bar member.

9 Claims, 7 Drawing Sheets

GRINDING MACHINE FOR GRINDING BAR MEMBER FOR MAGNETIC HEAD AND METHOD OF GRINDING THE SAME

BACKGROUND OF THE INVENTION

The present invention relates to a grinding machine for a bar member for magnetic heads and a method of grinding the bar member.

Magnetic head elements, which are used in magnetic disk drive units, etc., are manufactured by forming magnetizable layers and non-magnetizable layers on a ceramic substrate (a ceramic wafer). A lot of magnetic head elements are formed on the ceramic substrate. Each of the magnetic head elements includes: a magnetic head element section, which has a magnetoresistance effect head (a regenerating head) including an MR element, etc. and an electromagnetic induction head (a recording head); an monitor ELG element section, which is arranged adjacent to the magnetic head element section; and terminals (pads) connected to the magnetic head element section and the ELG element section.

The magnetic head elements are manufactured by the steps of: forming the magnetic head element sections, the ELG element sections, the terminals, etc. on the wafer; cutting the wafer so as to form a plurality of thin bar member; and grinding a side face of each bar member. Tens of the magnetic head element sections are linearly arranged in each bar member.

The side face of the bar member is ground so as to adjust a height of a sensing part including the MR element, which is called a strip height or an MR height, to a prescribed height. The lower sensing part has higher sensitivity. These days, in the magnetic head elements, required accuracy of the strip height is 0.8 $\mu$m±0.2 $\mu$m. But, in the near future, it must be higher: 0.3 $\mu$m±0.03 $\mu$m.

Since the strip height must be highly precisely adjusted, the ELG element section, whose structure is equal to that of the magnetic head element section, is provided for each magnetic head section. The ELG element section is simultaneously ground, and its resistance value is measured so as to monitor the sprit height of the corresponded magnetic head element section. With this action, the magnetic head elements can be ground with high accuracy.

A jig for grinding the bar member is shown in FIG. 21. The jig is disclosed in the U.S. Pat. No. 5,607,430.

The jig 10 is made of a metal or a ceramic. The bar member 12 is adhered onto the jig 10 with an adhesive, e.g., wax. A face of the bar member 10 to be ground is pressed onto a grinding plate, e.g., a lapping plate (not shown), with the jig 10 so as to grind the face to be ground.

The jig 10 includes a plurality of slits 14 having proper patterns and a plurality of actuator holes 16. Actuators, e.g., air cylinder units (not shown), are respectively provided in the actuator holes 16.

When the bar member 12 is ground, the actuators are driven to apply force to the jig 10. Since the jig 10 has the slits 14, the jig 10 can be bent by changing output force of the actuators. By bending the jig 10, pressure applying to each part of the bar member 10, from a bottom face, can be precisely controlled. Namely, the pressure applying to each magnetic head element section can be precisely controlled, so that grinding rate for each magnetic head element section can be controlled.

However, the conventional grinding machine and the conventional grinding method have following disadvantages.

As described above, the jig 10 is made of a metal or a ceramic having high strength, so the output force of the actuators must be great so as to bend the jig 10. In spite of forming the slits 14, it is difficult to bend the tough jig 10. Namely, it is difficult to precisely partially control the pressure applying to the parts of the bar member 12. Especially, it is very difficult to grind the bar member 12 with higher grinding accuracy. Further, a cost for manufacturing the jig 10 having the slits 14 must be increased.

SUMMARY OF THE INVENTION

An object of the present invention is to provide a grinding machine and a method of grinding, which are capable of grinding a bar member for a magnetic head with higher grinding accuracy.

To achieve the object, the grinding machine of the present invention comprises: means for holding a bar member, the holding means heading a first face of the bar member, which is to be ground, downward; a grinding plate for grinding the first face of the bar member; an actuator for pressing a second face, which is an opposite face with respect to the first face, of the bar member held by the holding means so as to press the first face onto the grinding plate; and means for monitoring a resistance value of a sensing part of an ELG element section of the bar member so as to adjust a strip height of a magnetic head section of the bar member.

The grinding method of the present invention comprises the steps of:

holding a bar member and heading a first face of the bar member, which is to be ground, downward; pressing a second face, which is an opposite face with respect to the first face, of the bar member, by an actuator, so as to press the first face onto a grinding plate and grind the same; and monitoring a resistance value of a sensing part of an ELG element section of the bar member so as to adjust a strip height of a magnetic head section of the bar member.

Another method of the present invention comprises the steps of: adhering flexible film onto a second face of a bar member, which is an opposite face with respect a first face thereof to be ground; holding the bar member with the flexible film and heading the first face of the bar member downward; pressing the second face of the bar member and the flexible film, by an actuator, so as to press the first face onto a grinding plate and grind the same; and monitoring a resistance value of a sensing part of an ELG element section of the bar member so as to adjust a strip height of a magnetic head section of the bar member.

In the present invention, the second face of the bar member is pressed, directly or with the flexible film, by the actuator, so that pressure can be differently and precisely applied to each element and the grinding accuracy can be improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

First Embodiment

First Embodiment will be explained with reference to FIGS. 1–3.

Figure 1:
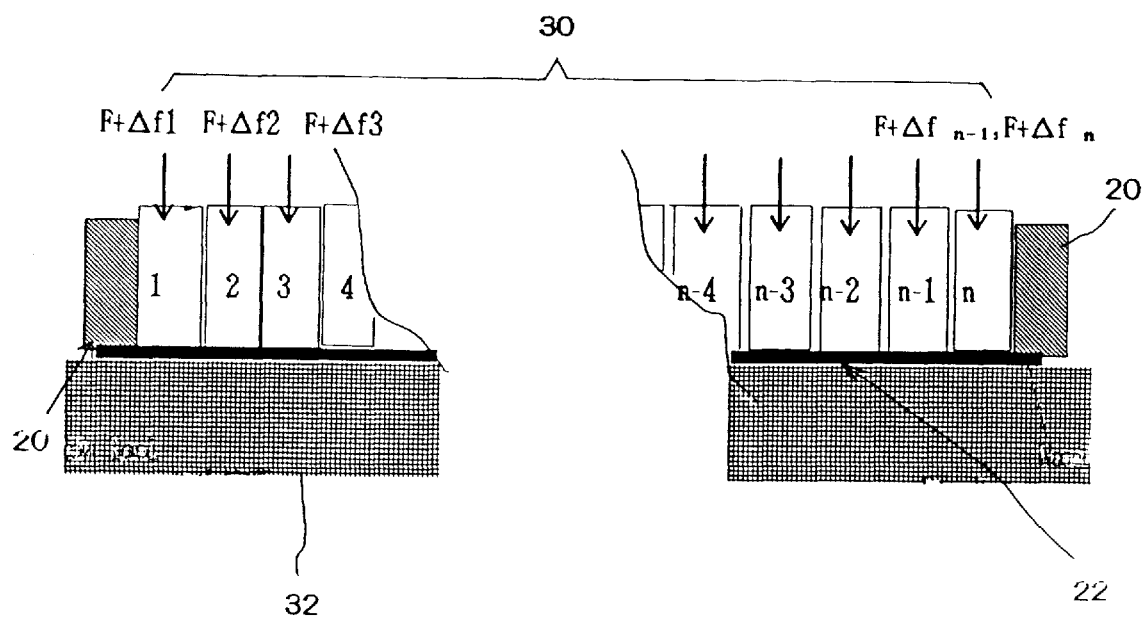
FIG. 1 is an explanation view of a state in which a bar member is held by a holding frame and the bar member is pressed onto a lapping plate by actuators.

In FIG. 1, a holding frame 20, which is an example of holding means, is a mere frame which has a vertical through-hole. Namely, an upper face and a bottom face of the holding frame 20 are opened. The holding frame 20 may be made of a metal, a ceramic, etc.

A bar member 22 is adhered, by an adhesive, e.g., wax, on the bottom face of the holding frame 20. A first face of the bar member 22, which will be ground, is headed downward. Therefore, a second face of the bar member 22, which is an opposite face with respect to the first face, is exposed in the through-hole of the holding frame 20.

Tens of magnetic head elements are linearly arranged in the bar member 22. Each of the magnetic head elements includes: a magnetic head element section, which has a magnetoresistance effect head (a regenerating head) including an MR element, etc. and an electromagnetic induction head (a recording head); an monitor ELG element section, which is arranged adjacent to the magnetic head element section; and terminals (pads) connected to the magnetic head element section and the ELG element section. The structure of the bar member 22 is well known, so it is not shown in the drawings.

Figure 2:
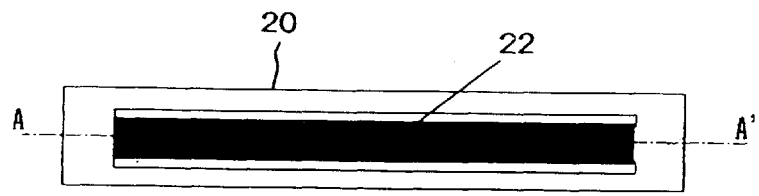
FIG. 2 is a plan view of the state shown in FIG. 1.

FIG. 2 is a plan view of a state in which the bar member 22 is fixed to the holding frame 20; FIG. 3 is a front view thereof.

Figure 3:
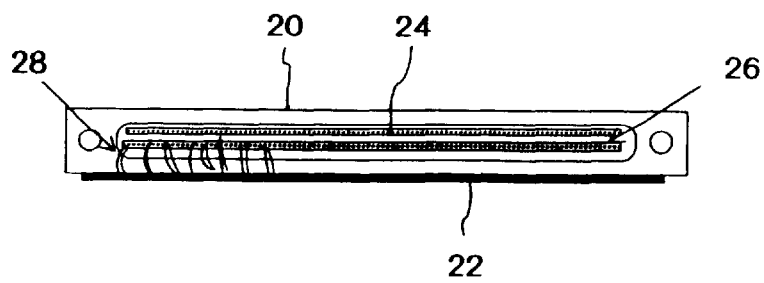
FIG. 3 is a front view of the state shown in FIG. 1.

As shown in FIG. 3, a printed circuit board 26, on which cable patterns 24 are formed, is fixed to a side face of the holding frame 20. The cable patterns 24 of the circuit board 26 are respectively electrically connected to the terminals (not shown) of the ELG element sections by wires 28. By touching the cable pattern 24 of the selected ELG element section with a prove pin of a resistance monitor so as to measure the resistance value of the selected ELG element section.

In FIG. 1, a plurality of actuators 30 are provided in the through-hole of the holding frame 20. Each actuator 30 includes an air cylinder unit, a voice coil motor, a piezo element, etc. Each actuator 30 directly contacts a pair of the magnetic head element section and the ELG element section, from the second face side, so as to press the first face onto a lapping plate 32, which is an example of a grinding plate.

Namely, the first face of the bar member 22 can be ground by the steps of:

holding the bar member 22 and heading the first face downward by the holding frame 20; and directly pressing the second face of the bar member 22, which has been held by the holding frame 20, by the actuators 30, onto the lapping plate 32.

In the present embodiment, Each actuator 30 directly contacts a pair of the magnetic head element section and the ELG element section, the pairs of the magnetic head element section and the ELG element section can be respectively pressed by the actuators 30. Namely, each pair can be properly pressed, with proper pressure, by the actuator, so that grinding accuracy can be higher, e.g., three-sigma limit $3\sigma \leq 0.1$ μm.

Basic pressing force "F" may be effectively applied to the holding frame 20 by an independent actuator (not shown). In this case, each actuator 30 may apply small pressing force ΔF, so that the pressing force of each actuator 30 can be precisely controlled.

Since the bar member 22 will be ground about 5–6 μm, the bar member 22 may be roughly ground at the beginning, but the last 1 μm must be precisely finished. While the bar member 22 is precisely finished, amount of grinding (lapping) is monitored so as to effectively precisely grind.

Low pressure, e.g., about 1 Kg/cm$^2$, is applied to the bar member 22 so as to grind the bar member 22 with proper lapping rate. If the pressure of 1 Kg/cm$^2$ is applied to the bar member 22, the bar member 22 is wholly pressed with the pressing force of 480–600 g. Namely, each magnetic head element receives the pressing force of about 16 g.

While precisely grinding the last 1 μm, amount of grinding the magnetic head elements are varied about 0.12 μm, and the variations respectively applied to the magnetic head elements so as to solve the variations of 0.12 μm (max. 0.3 μm). In the case that each magnetic head element receives the average pressing force of 16 g, the difference between the pressing forces is 1.92 g when the variation is 0.12 μm; maximum difference is 4.8 g (the variation: 0.3 μm).

Figure 21:
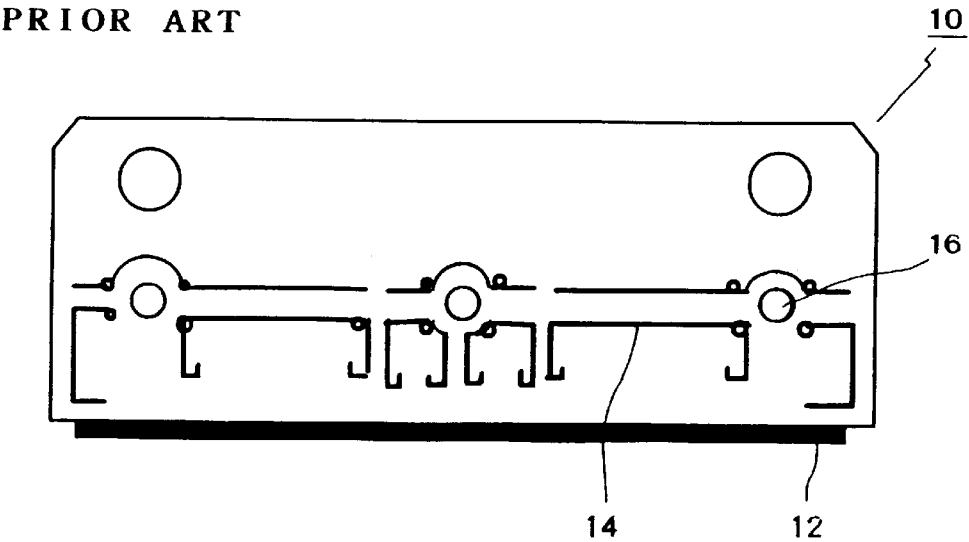
FIG. 21 is a front view of the conventional jig for grinding the bar member.

The slight difference between the pressing forces cannot be realized by the conventional jig 10 shown in FIG. 21.

On the other hand, in the present embodiment, the magnetic head elements in the bar member 22 are respectively independently pressed by the actuators 30. Further, the actuators 30 directly contact the bar member 22. Therefore, the slight difference between the pressing forces can be easily and correctly realized, and the grinding accuracy can be highly improved.

Preferably, each actuator 30 presses a pair of the magnetic head element section and the ELG head element section. But the actuators 30 may press as shown in FIGS. 4 and 5.

Figure 4:
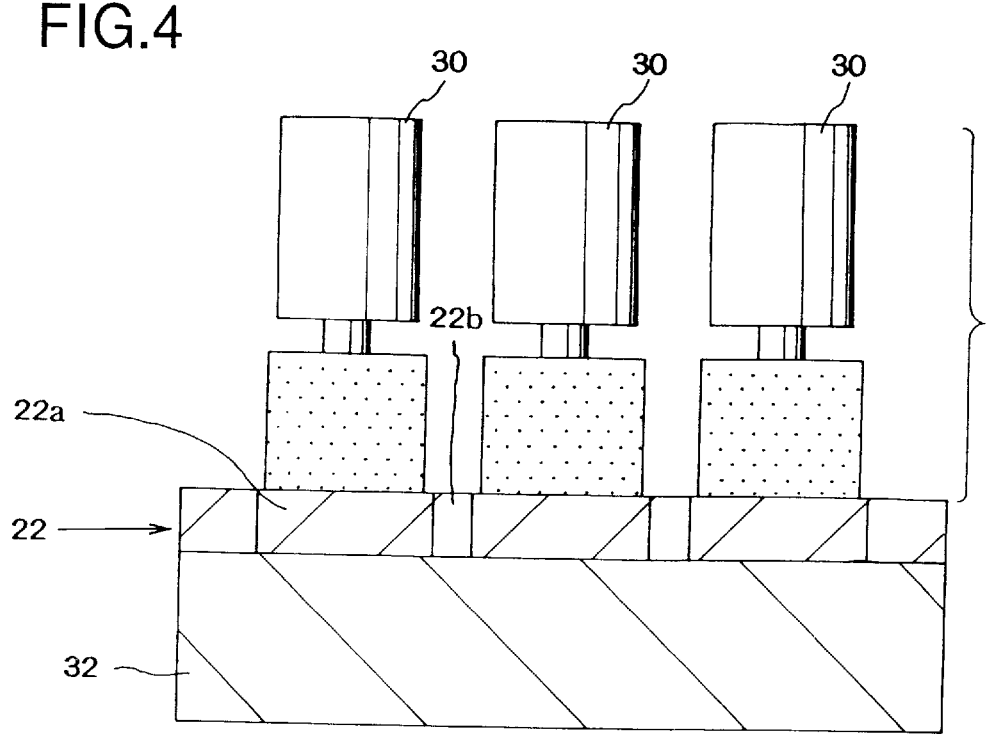
FIG. 4 is an explanation view of a state in which the bar member is pressed by the actuator.
Figure 5:
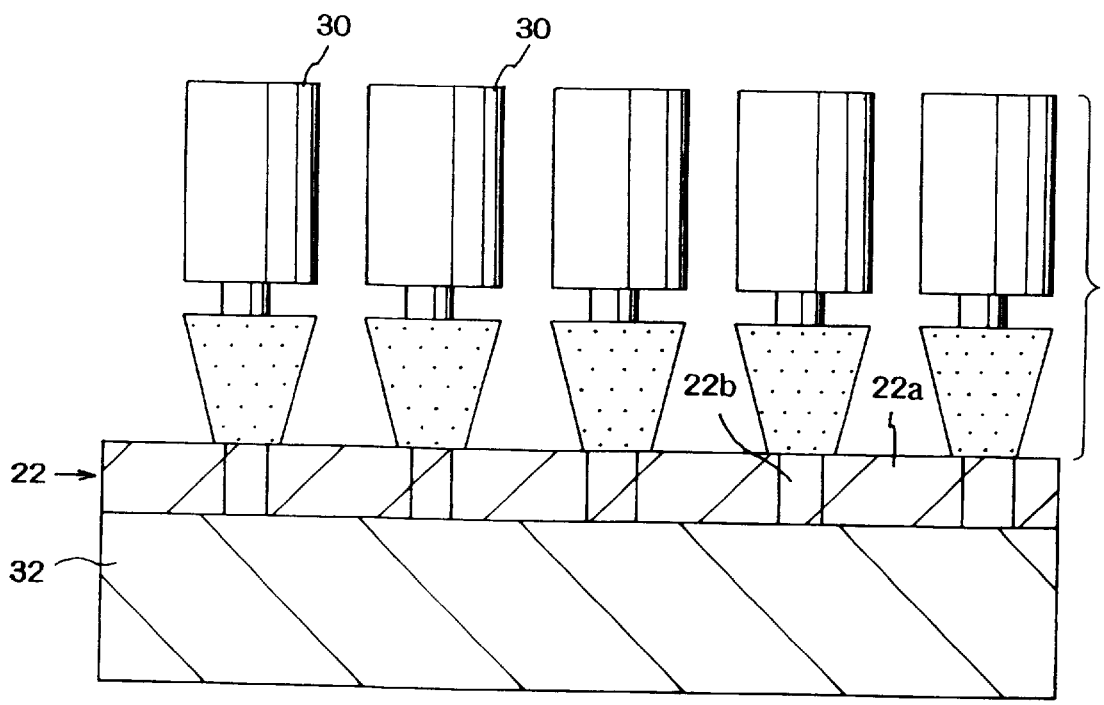
FIG. 5 is an explanation view of another state in which the bar member is pressed by the actuator.

In FIG. 4, each actuator 30 directly presses the magnetic head element section 22a; in FIG. 5, each actuator 30 presses the magnetic head element section 22a and the adjacent ELG element section 22b.

In the present invention, the state of "pressing the magnetic head element section and the ELG element section with the actuator" includes the states shown in FIGS. 4 and 5.

Second Embodiment

Figure 6:
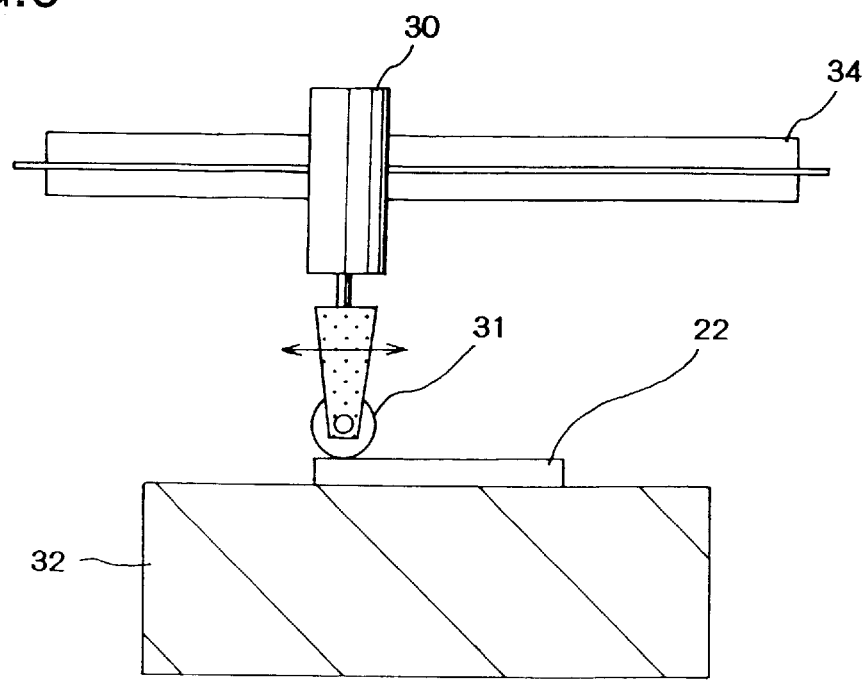
FIG. 6 is an explanation view of an actuator having a roller.

In the First Embodiment, a plurality of the actuators 30 press the bar member 22; in the Second Embodiment, one actuator 30 presses the bar member 22 as shown in FIG. 6.

Figure 7:
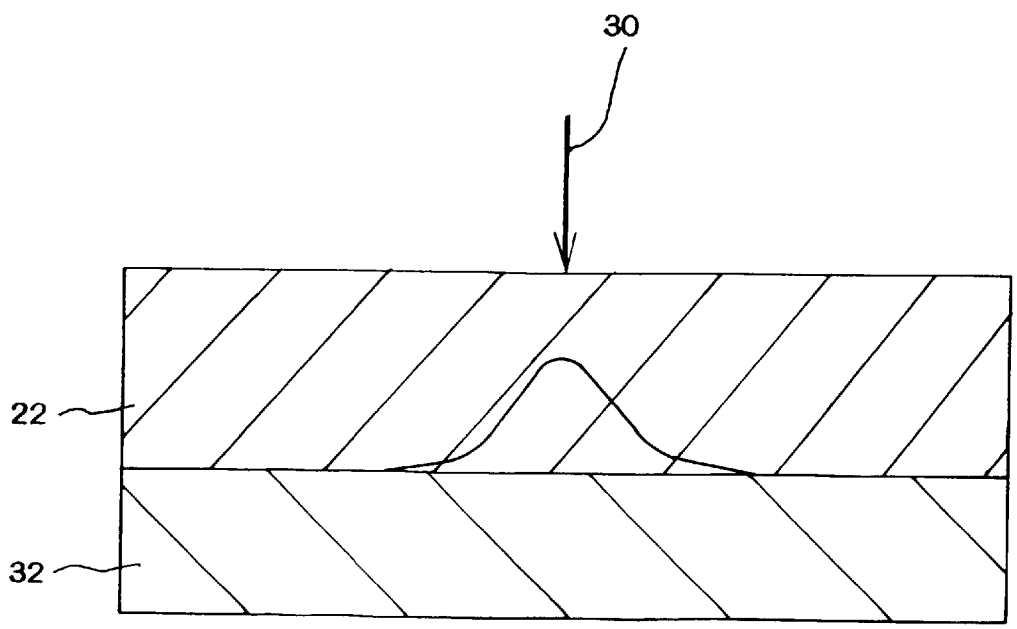
FIG. 7 is an explanation view showing load distribution when the actuator having the roller is used.

In the present embodiment, the actuator 30 is moved in the longitudinal direction of the bar member 22 by means 34 for moving the actuator 30, e.g., a ball screw. The second face of the bar member 22 is pressed by a roller 31, which is rotatably provided to a lower end of the actuator 30. The roller 31 is capable of pressing the second face at any positions on its stroke. The roller 31 linearly contacts the second face, but the pressing force is transmitted downward within angle of about 45°, so that the pressing force works to one magnetic head element in the first face. Distribution of the pressing force is shown in FIG. 7.

Third Embodiment

Figure 8:
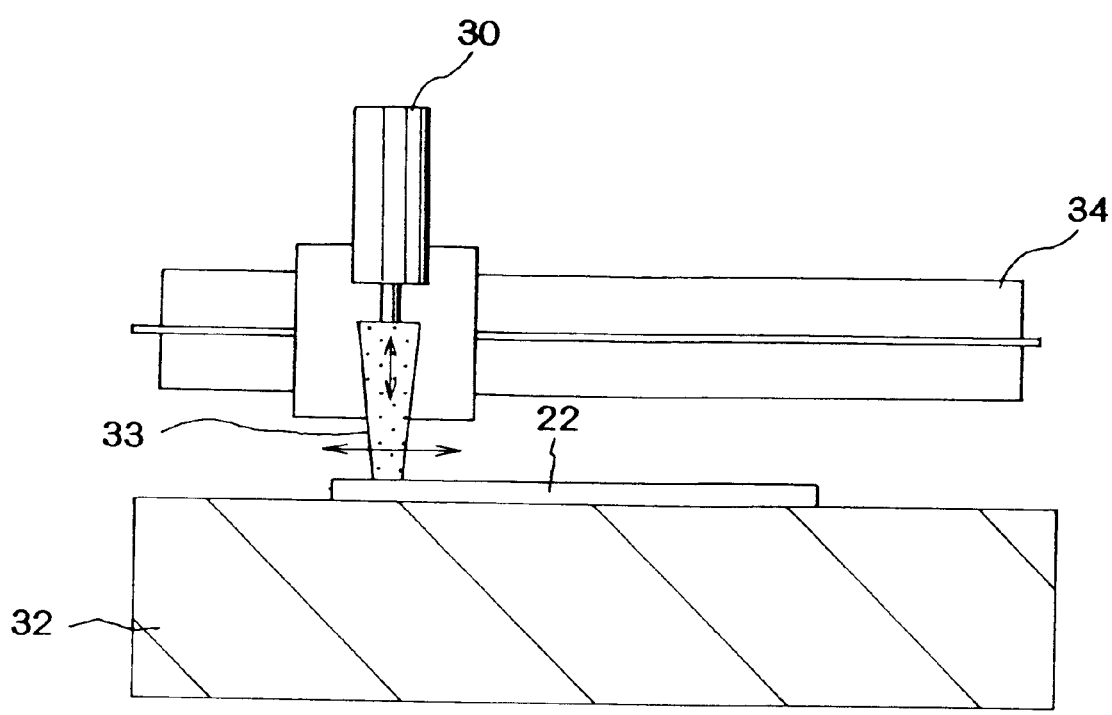
FIG. 8 is an explanation view of a movable actuator.

In Third Embodiment too, as shown in FIG. 8, one actuator 30 is moved in the longitudinal direction of the bar member 22 by the moving means 34. In the present embodiment, the second face of the bar member 22 is pressed by a pressing member 33 of the actuator 30. A bottom face of the pressing member 33 has prescribed area, which is equal to, for example, area of one magnetic head element. By releasing the pressing force working to the second face, the actuator 30 can be moved along the bar member 22.

Fourth Embodiment

Figure 9:
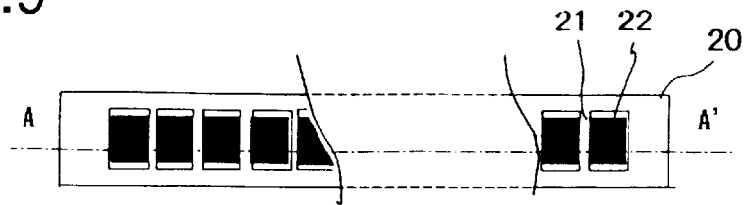
FIG. 9 is a plan view of a state in which the bar member is held by a holding frame having partitions.

Fourth Embodiment will be explained with reference to FIG. 9 and FIG. 10.

In the present embodiment, the holding frame 20 has a plurality of partitions 21, each of which corresponds to each ELG element section of the bar member 22. The holding frame 20 is capable of holding the bar member 22 and heading the first face of the bar member 22 downward.

The bar member 22 is adhered on the bottom face of the holding frame 20 by an adhesive, e.g., wax. The ELG element sections of the bar member 22 are electrically connected as well as the First Embodiment shown in FIG. 3.

Figure 10:
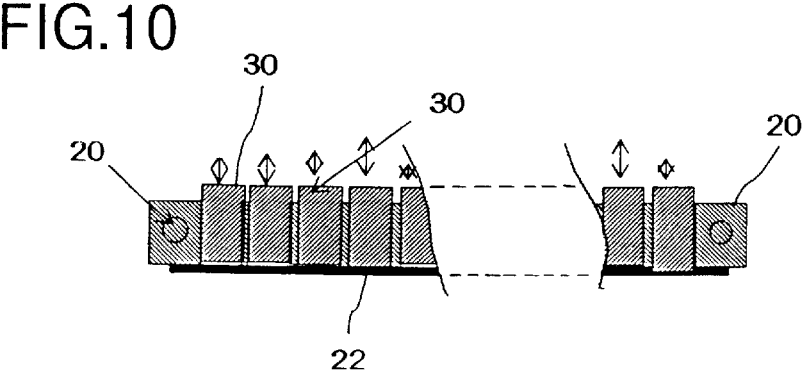
FIG. 10 is a sectional view taken along a line A—A' shown in FIG. 9.
Figure 11:
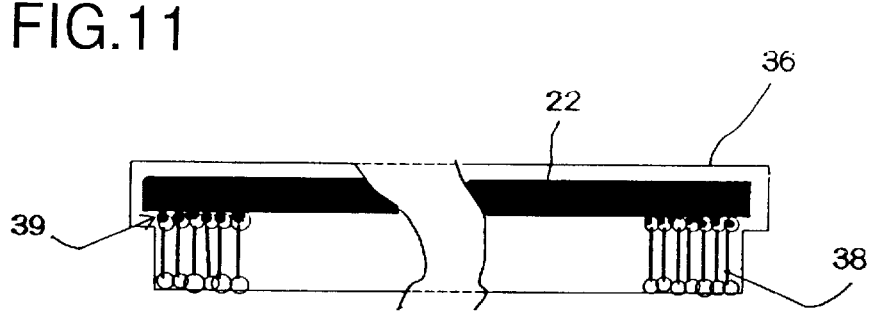
FIG. 11 is a plan view of a state in which the bar member is adhered on flexible film.

As shown in FIG. 10, a plurality of the actuators 30 are respectively inserted in through-holes of the holding frame 20. And, the actuators 30 directly press the second face of the bar member 22, which is held by the holding frame 20, so as to press the first face thereof onto the lapping plate 32.

In the present embodiment too, the magnetic head elements are respectively pressed by the actuator 30, so that the grinding accuracy can be higher, e.g., three-sigma limit $3\sigma \leq 0.12$ $\mu$m.

Fifth Embodiment

Fifth Embodiment will be explained with reference to FIGS. 11–14.

In the present embodiment, flexible film 36 is adhered on the second face of the bar member 22. The holding frame 20 is capable of holding the bar member 22, together with the flexible film 36, and heading the first face of the bar member 22 downward. The bar member 22 is adhered on the bottom face of the holding frame 20, with the flexible film 36, by the adhesive. The holding frame 20 is equal to the holding frame shown in FIG. 1.

Monitor cable patterns 38, each of which will be electrically connected to each ELG element section of the bar member 22, are formed on the flexible film 36. The cable patterns 38 are respectively electrically connected to terminals of the ELG element sections by gold balls 39. They may be connected by electric-conductive paste, wires, etc. instead of the gold balls.

Figure 12:
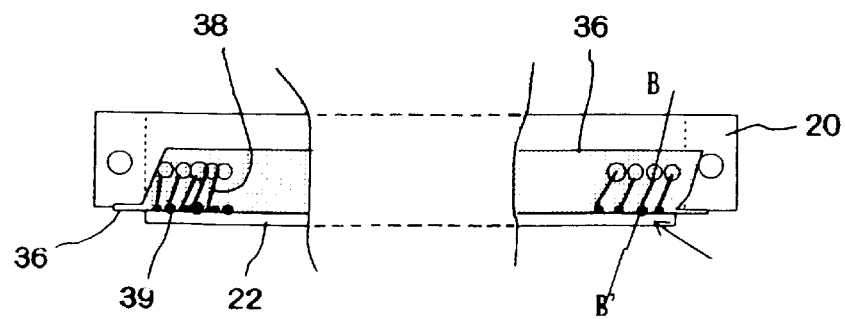
FIG. 12 is a front view of a state in which the bar member is held by the holding frame together with the flexible film.
Figure 13:
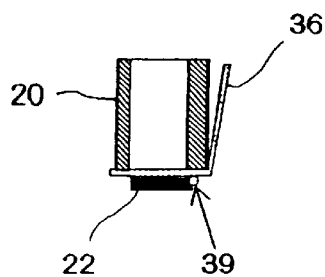
FIG. 13 is a sectional view taken along a line B—B' shown in FIG. 12.

As shown in FIGS. 12 and 13, the flexible film 36 is bent, so that the cable patterns 38 faces to a front face of the holding frame 20. By touching the capable pattern 38 of the selected ELG element section with the prove pin of the resistance monitor (not shown) so as to measure the resistance value of the selected ELG element section to be ground.

The actuators 30 press the second face of the bar member 22, which is held by the holding frame 20, together with the flexible film 36 (see FIG. 14), so as to press the first face thereof onto the lapping plate 32.

Figure 14:
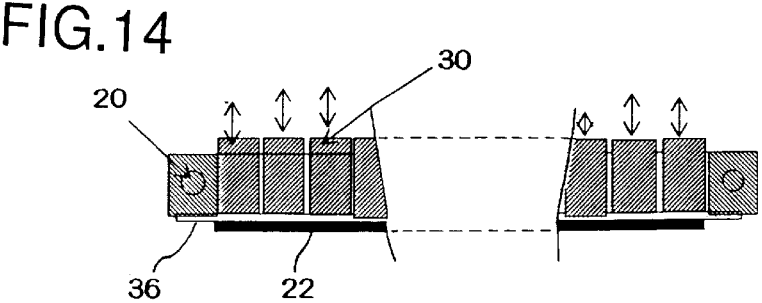
FIG. 14 is a longitudinal sectional view of the state shown in FIG. 12.
Figure 15:
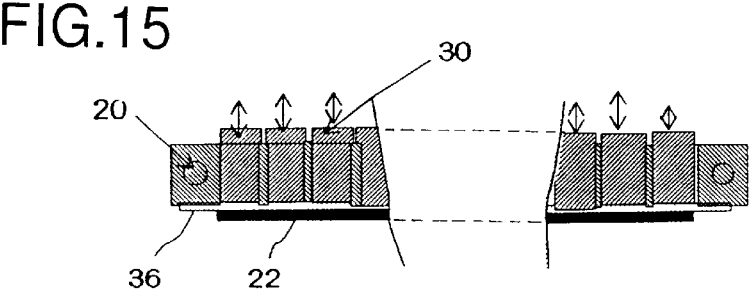
FIG. 15 is a sectional view of the state in which the bar member is held by the holding frame together with the flexible film.

As shown in FIG. 14, each actuators 30 presses a pair of the magnetic head element section and the ELG element section. Note that, one movable actuator, which is shown in FIG. 6 or 8, may be employed.

In the present embodiment too, the bar member 22 is pressed, together with the flexible film 36, by the actuators 30. Unlike the conventional method in which the tough jig 10 shown in FIG. 21 is used, the bar member 22 can be bent by small pressing force because of the flexible film 36. Further, the magnetic head elements can be respectively pressed by the actuators 30, so that the grinding accuracy can be higher, e.g., three-sigma limit $3\sigma \leq 0.12$ $\mu$m.

The holding frame 20 has a plurality of the partitions 21, each of which corresponds to each ELG element section of the bar member 22. The holding frame 20 is capable of holding the bar member 22 and heading the first face of the bar member 22 downward.

Sixth Embodiment

Sixth Embodiment will be explained with reference to FIGS. 16–20.

Figure 16:
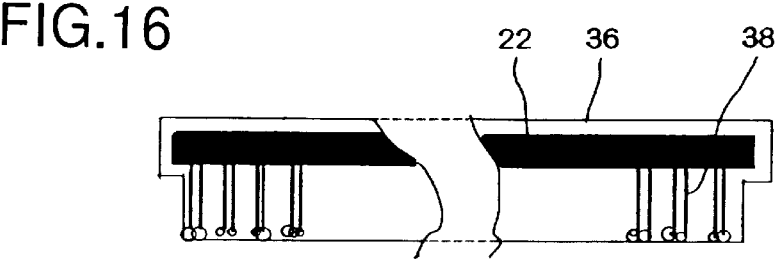
FIG. 16 is a plan view of a state in which the bar member is adhered, by an adhesive, on the flexible film.

In the present embodiment, as shown in FIG. 16, the flexible film 36 is adhered, on the second face of the bar member 22, by an adhesive, e.g., a both-sided adhesive tape. The monitor cable patterns 38 are formed on the flexible film 36.

Figure 17:
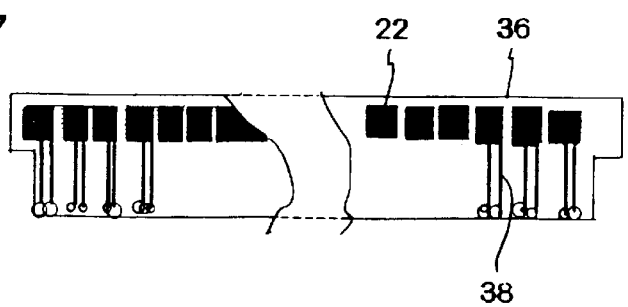
FIG. 17 is a plan view of a state in which the bar member is cut to from a plurality of headpieces.

Next, as shown in FIG. 17, the bar member 22, to which the flexible film 36 is adhered, is cut to form a plurality of head pieces, each of which includes the magnetic head element section and the ELG element section.

The cable patterns 38 and the ELG element sections are mutually connected before or after cutting the bar member 22.

Figure 18:
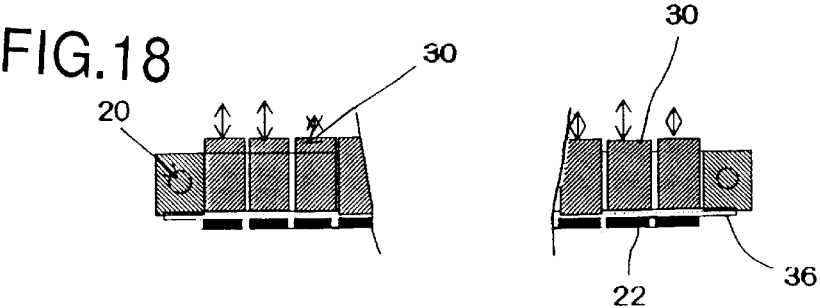
FIG. 18 is a sectional view of a state in which the head pieces are held by the holding frame together with the flexible film.
Figure 19:
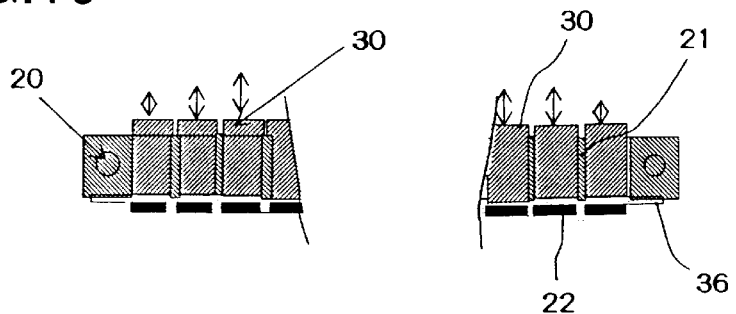
FIG. 19 is a sectional view of a state in which the head pieces are held by the holding frame, which has the partitions, together with the flexible film.

Next, as shown in FIG. 18, the bar member 22, to which the flexible film 36 is adhered, is adhered to the holding frame 20, which has no partitions as well as the holding frame of the First Embodiment, by the adhesive. Then, the actuators 30 press the second face of the bar member 22, which has been divided into a plurality of the headpieces. By pressing the bar member 22, the first face of the bar member 22 is pressed onto the lapping plate 32, so that the first face can be ground.

Unlike the example shown in FIG. 18, the bar member 22, to which the flexible film 36 is adhered, may be adhered to the holding frame 20, which has the partitions (see FIG. 19), then the actuators 30 may press the second face of the bar member 22 so as to grind the first face thereof.

Preferably, the bar member 22 is ground after cutting the bar member 22 because amount of grinding can be monitored for each head piece. However, the head pieces are very small pieces, whose sizes are about 1 mm, so it is impossible to grind the small head pieces.

In the present embodiment, the small head pieces are adhered on the flexible film 36, so that they will never separate and they can be ground as one body. Since the bar member 22 is cut and formed into the head pieces, each actuator 30 can securely press the corresponding head piece only, so that the grinding accuracy can highly improved.

Figure 20:
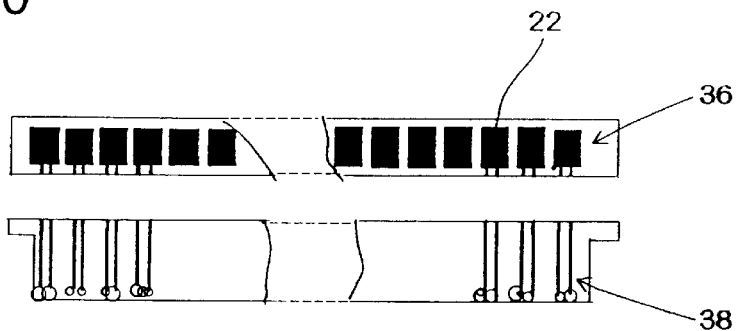
FIG. 20 is an explanation view of a state in which cable patterns are removed from the flexible film.

In the following steps, e.g., crown lapping, forming an air bearing surface (ABS), the head pieces are integrated by the flexible film 36. In this case, as shown in FIG. 20, a useless part of the flexible film 36, in which the cable patterns 38 are formed, may be removed for the following steps.

In the above described embodiments, in which the bar member 22 is adhered on the flexible film 36 then the bar member 22 is ground, the holding means need not be formed into the frame shape. For example, the holding means may be constituted by a pair of chucking units (not shown), which are capable of holding both ends of the bar member 22. By employing the chucking units too, the bar member 22 can be ground.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A grinding machine for grinding a bar member for a magnetic head, comprising:
    means for holding the bar member, said holding means heading a first face of the bar member, which is to be ground, downward;
    a grinding plate for grinding the first face of the bar member;
    a plurality of actuators for pressing a second face, which is an opposite face with respect to the first face, of the bar member held by said holding means so as to press the first face onto said grinding plate; and
    means for monitoring a resistance value of a sensing part of an ELG element section of the bar member so as to adjust a strip height of a magnetic head section of the bar member,
    wherein each of said actuators presses a pair of the ELG element section and the magnetic head section.

2. The grinding machine according to claim 1,
    wherein said holding means is a holding frame, in which a through-hole is formed in the vertical direction and to which the bar member is adhered by an adhesive, and the plurality of actuators are held in the holding means.

3. A grinding machine for grinding a bar member for a magnetic head, comprising:
    means for holding the bar member, said holding means heading a first face of the bar member, which is to be ground, downward;
    a grinding plate for grinding the first face of the bar member;
    a plurality of actuators for pressing a second face, which is an opposite face with respect to the first face, of the bar member held by said holding means so as to press the first face onto said grinding plate; and
    means for monitoring a resistance value of a sensing part of an ELG element section of the bar member so as to adjust a strip height of a magnetic head section of the bar member,
    wherein said holding means is a holding frame, in which a through-hole is formed in the vertical direction and which has a plurality of partitions, each of which corresponds to each ELG section of the bar member, and
    said plurality of actuators are respectively held in spaces which are divided by the partitions.

4. A grinding machine for grinding a bar member for a magnetic head, comprising:
    means for holding the bar member, said holding means heading a first face of the bar member, which is to be ground, downward;
    a grinding plate for grinding the first face of the bar member;
    an actuator for pressing a second face, which is an opposite face with respect to the first face, of the bar member held by said holding means so as to press the first face onto said grinding plate; and
    means for monitoring a resistance value of a sensing part of an ELG element section of the bar member so as to adjust a strip height of a magnetic head section of the bar member,
    wherein said actuator presses the second face of the bar member with flexible film, and
    said flexible film has a plurality of monitor cable patterns, each of which are electrically connected to each ELG section of the bar member held.

5. The grinding machine according to claim 4,
    wherein said actuator is moved in the longitudinal direction of the bar member and capable of pressing the second face at any positions within the moving range.

6. The grinding machine according to claim 4,
    wherein a plurality of said actuators are provided, said plurality of actuators being held in the holding means; and
    each of said actuators presses a pair of the ELG element section and the magnetic head section.

7. The grinding machine according to claim 4,
    wherein said holding means is a holding frame, in which a through-hole is formed in the vertical direction and which has a plurality of partitions, each of which corresponds to each ELG section of the bar member,
    wherein a plurality of said actuators are respectively held in spaces which are divided by the partitions.

8. A method of grinding a bar member for a magnetic head, comprising the steps of:
    adhering flexible film onto a second face of the bar member, which is an opposite face with respect to a first face thereof to be ground;

holding the bar member with the flexible film and heading the first face of the bar member downward;

pressing the second face of the bar member and the flexible film, by an actuator, so as to press the first face onto a grinding plate and grind the same; and monitoring a resistance value of a sensing part of an ELG element section of the bar member so as to adjust a strip height of a magnetic head section of the bar member.

9. The method according to claim 8, further comprising the step of cutting the bar member, on which the flexible film has been adhered, to form a plurality of head pieces, each of which includes the ELG element section and the magnetic head section.

\* \* \* \* \*